Patented Nov. 30, 1948

2,454,942

UNITED STATES PATENT OFFICE 2,454,942

PREPARATION OF SPHERICAL ADSORBENT PARTICLES

Jerry A. Pierce and Charles N. Kimberlin, Jr., Baton Rouge, La., assignors to Standard Oil Development Company, a corporation of Delaware No Drawing. Application August 23, 1944, Serial No. 550,863

16 Claims. (Cl. 252—273)

This invention relates to a process for the preparation of spherical catalytic particles and it relates more particularly to the preparation of such spherical particles from natural earths.

Natural inorganic earths, such as clay, bauxite, diatomaceous earth, etc., are well known and have been long used for various purposes, for example, for the adsorption of condensible vapors from gaseous carriers and for catalytic purposes either as the catalyst itself or as a component thereof or as a carrier.

Such natural earths with or without the addition of other materials, have been found to be useful as catalysts for carrying out various catalytic reactions and have been found to be particularly useful in reactions involving hydrocarbons. In such reactions the catalyst may be employed as a fixed bed, as a moving bed or as a powder in the so-called fluid process.

It has recently been found that catalyst particles prepared in the form of spheres are particularly suited for the moving bed and the fluid type processes. Due to their spherical shape such catalyst particles are subject to much less attrition in use. When employed for the moving bed or thermofor process fairly large sizes upward of 1 mm. are particularly useful. For the fluid process particles having a diameter less than 1 mm. are used. Spherical particles of this size are much more easily fluidized than the usual type of ground material. Spherical particles less than 1 mm. in diameter may be prepared by intimately dispersing a hydrosol in a non-completely water-miscible liquid, such as oil or normal butanol, while the larger particles are prepared by allowing a hydrosol of a gel-forming substance to set while suspended in a body of a viscous medium having a density slightly less than that of the sol, such as a heavy oil or the like.

It has, however, not been previously possible to prepare spherical particles of natural adsorbent materials because of their lack of sufficient plasticity to easily assume the spherical form. Yet it would be highly desirable to use these natural earths instead of the synthetic gels, since they are highly adsorptive and are relatively much cheaper than the synthetic types.

It is therefore one object of the present invention to provide a method for preparing spherical particles from natural adsorbent materials.

It is a further object of this invention to provide a method for improving the catalytic properties of natural adsorbent materials.

These and other objects of this invention are attained by first gelling the adsorbent materials and then shaping the gelled material into spherical particles of the desired size. The gellation may be accomplished by dispersing the adsorbent in water or other liquid and then introducing the colloidal solution thus formed into a medium wherein the colloidal particles coalesce to form discrete spheres, with or without agitation. The coalescing may be facilitated by heat. A particularly suitable method is to mix the powdered adsorbent or colloidal solution with a hydrosol such as silica or alumina or other sol, which upon setting acts to cement the particles of finely divided adsorbent material. For the specific preparation of spherical particles having diameters of less than 1 mm. the colloidal mass of adsorbent particles with or without the addition of a hydrosol is dispersed through a jet, nozzle, or other orifice into a water immiscible liquid medium such as naphtha, kerosene, gas oil, benzol, ethylene dichloride, nitrobenzene, chloroform, carbon tetrachloride, or in a partially water miscible liquid such as normal butanol, secondary butanol, methyl ethyl ketone, diethyl ketone, mesityl oxide, etc., and maintained in a highly dispersed condition until the particles form spheres. If the adsorbent is mixed with a hydrosol this may be done either before or after dispersing the adsorbent in the organic liquid. The dispersion is facilitated by the use of a suitable dispersing agent. Suitable dispersing agents include soap, olefin or alcohol sulfates, such as sodium lauryl sulfate, organic sulfonate and various commercial emulsifiers, diglycol oleate, etc.

The actual diameters of the spheres obtained depend upon the degree of dispersion which is a function of the viscosity of the dispersing medium, the degree of agitation, the ratio of sol to dispersing medium and the amount and kind of dispersing agent used. The spherical particles thus obtained are washed and dried and then heated to a temperature of 850° F. to 1200° F. for activation. The drying is preferably carried out in the presence of an organic liquid such as oil, isopropyl alcohol, normal butanol and the like. The drying may also be carried out in the presence of a surface active agent such as lecithin, organic sulfates, sulfonates, partial esters of polyhydroxy alcohols, etc.

If spheres larger than 1 mm. diameter are desired, droplets of dispersed natural earth with or without the addition of a hydrosol are suspended in a water-immiscible liquid such as oil in a substantially quiescent state, with only sufficient movement of the liquid to prevent coalescing of the droplets. The colloidal solution of the natural adsorbent is preferably introduced into the water-immiscible liquid through nozzles of a size to produce particles of the desired diameter. The process is best carried out by allowing the droplets to descend a column of sufficient height so that the drops have sufficient time to set to firm discrete particles. The spheres thus formed may be received into a body of water placed directly beneath the column of water-immiscible liquid, the water separated and the particles dried in the same manner as described above in connection with the formation of the smaller particles.

The method according to this invention may be applied to any type of finely powdered adsorbent material such as ball clay, bentonite, bauxite, pumice, kieselguhr, diatomaceous earth, vermiculite, carbon, brick, tufa, infusorial earth, tripoli, fossil meal, synthetic gels, etc.

A particularly suitable material for preparing spherical particles according to this invention is a bentonite which has been treated with 175 lbs. of 98% $H_2SO_4$ per 100 lbs. of bentonite at an acid concentration of 50 to 60%. This drastic treatment almost completely removes the alumina, iron and calcium from the silica base of the bentonite. The product has many of the properties of silica gel. It is highly adsorbent to water vapor and is capable of being bound very tightly to a hydrosol in which it is immersed. Such a material has a greater reproducibility, lower cost and gives more uniformly spherical particles than other types of natural adsorbents. Furthermore, a large amount of valuable aluminum sulfate is produced as a by-product.

The following examples illustrate the preparation of spherical catalysts according to this invention:

Example I

A highly acid-treated bentonite of the type described above was ground to a powder and screened through 100 mesh. The fines were made into a thin slurry with a silica sol containing about 10% $SiO_2$, and 125 cc. of this slurry was dispersed mechanically in about 1300 cc. of butanol for two hours, filtered, washed, and dried at 90° F. Rounded grains about 0.2 mm. in diameter were formed.

Example II

Five grams of 250 mesh extreme acid overtreated bentonite prepared as in Example I were dispersed mechanically in 1200 cc. of butanol. To the swirling mixture was added 35 cc. of 5.4% alumina sol and the stirring continued for an hour and a half. A product consisting partly of small geometrical spheres and somewhat larger particles was obtained. The final product contained about 27% of added alumina.

The spherical particles produced according to this invention have many industrial uses. Those having diameters less than 1 mm. are particularly suited for the conversion of hydrocarbons by the so-called fluid catalyst process. For example these spheres may be used alone or with the addition of other materials for the cracking, hydrogenation, and dehydrogenation of oils, for the reforming of naphthas in the presence or absence of hydrogen, for the isomerization and alkylation of hydrocarbons, for the hydrogenation of the oxides of carbon, etc. They may be used alone or as carriers for the other catalyst materials. For example, they may be impregnated with oxides or sulfides of metals of the IV, V, VI, and VIII groups of the periodic system to produce catalysts eminently suited for the reforming of naphtha in the presence of hydrogen, for the cracking and dehydrogenation of oil, etc.

The nature and objects of the present invention having thus been fully set forth and illustrative embodiment of the same given, what is claimed as new and useful and desired to be secured by Letters Patent is:

1. An improved process for preparing spherical particles of a highly acid-treated bentonite which comprises separately dispersing finely powdered acid-treated bentonite and a silica sol in normal butanol, agitating the dispersion until the silica sol sets to a hydrogel to form spherical particles of hydrogel and bentonite, and removing the particles from the butanol.

2. An improved process for preparing spherical particles of a highly acid-treated bentonite which comprises mixing a finely powdered bentonite with alumina sol, dispersing the mixture in normal butanol, agitating the dispersion until the alumina sol sets to a hydrogel to form spherical particles of hydrogel and bentonite and removing the particles from the butanol.

3. An improved process for preparing spherical particles of a natural adsorbent comprising separately dispersing finely powdered adsorbent and a hydrosol in a partially water-miscible liquid, agitating the dispersion until the hydrosol sets to a hydrogel to form spherical particles of gel and absorbent and removing the particles from the liquid.

4. An improved process for preparing spherical particles of a natural adsorbent which comprises dispersing finely divided natural adsorbent and a hydrosol in a partially water-miscible liquid, agitating the dispersion until the hydrosol sets to a hydrogel to form spherical particles of gel and adsorbent and removing the particles from the liquid.

5. A process according to claim 4 wherein the natural adsorbent comprises bentonite clay.

6. A process according to claim 4 wherein the partially water-miscible liquid comprises butanol.

7. A process according to claim 4 wherein the hydrosol comprises alumina sol.

8. A process for preparing spherical particles of a natural adsorbent which comprises mixing finely divided natural adsorbent with a hydrosol, dispersing the mixture in a partially water-miscible liquid, agitating the dispersion until the hydrosol sets to a hydrogel to form spherical particles of gel and adsorbent and removing the particles from the liquid.

9. A process according to claim 8 wherein the natural adsorbent comprises bentonite clay.

10. A process according to claim 8 wherein the partially water-miscible liquid comprises butanol.

11. A process for preparing spherical particles of a treated bentonite which comprises dispersing finely divided highly acid-treated bentonite and a hydrosol in butanol, agitating the dispersion until the hydrosol sets to a hydrogel to form spherical particles of hydrogel and bentonite and removing the spherical particles from the butanol.

12. A process according to claim 11 wherein the hydrosol comprises alumina sol.

13. A process for preparing spherical particles of a treated bentonite which comprises mixing finely divided highly acid-treated bentonite with a hydrosol, dispersing the mixture in butanol, agitating the dispersion until the hydrosol sets to a hydrogel to form spherical particles of hydrogel and bentonite and removing the spherical particles from the butanol.

14. An improved process for preparing spherical particles of a natural adsorbent which comprises dispersing finely divided adsorbent in a partially water-miscible liquid, then adding alumina sol, agitating the resulting dispersion until the hydrosol sets to a hydrogel to form spherical particles of gel and adsorbent and removing the particles from the liquid.

15. A method according to claim 14 wherein the natural adsorbent comprises bentonite clay.

16. A method according to claim 14 wherein the partially water-miscible liquid comprises butanol.

JERRY A. PIERCE,
CHARLES N. KIMBERLIN, JR.

REFERENCES CITED

The following references are of record in the file of this patent:

UNITED STATES PATENTS

| Number | Name | Date |
|---|---|---|
| 2,384,944 | Marisic | Sept. 18, 1945 |
| 2,384,945 | Marisic | Sept. 18, 1945 |
| 2,408,986 | Marisic et al | Oct. 8, 1946 |

FOREIGN PATENTS

| Number | Country | Date |
|---|---|---|
| 15,365 | Great Britain | 1915 |